United States Patent [19]
Shoda

[11] Patent Number: 4,945,958
[45] Date of Patent: Aug. 7, 1990

[54] AUTOMATIC PROCESSING HEAD REPLACEMENT DEVICE IN WOOD WORKING MACHINE

[76] Inventor: Isao Shoda, 116-4, Okaba-cho, Hamamatsu-shi, Shizuoka-ken, Japan

[21] Appl. No.: 285,552

[22] Filed: Dec. 16, 1988

[30] Foreign Application Priority Data

Dec. 16, 1987 [JP]  Japan .............................. 62-19094[U]

[51] Int. Cl.⁵ .......................... B23B 7/04; B27C 9/04
[52] U.S. Cl. .................................. 144/1 R; 29/26 A; 29/41; 144/1 A; 408/31; 409/217
[58] Field of Search ............... 144/1 R, 1 A, 3 R, 367; 408/31, 34, 35; 409/217; 29/39, 40, 41, 564, 26 A

[56] References Cited

U.S. PATENT DOCUMENTS 4,313,478  2/1982  Suzuki ................................. 144/1 A
4,593,731  6/1986  Tanaka ................................ 144/1 A

FOREIGN PATENT DOCUMENTS 2058658  4/1981  United Kingdom .

Primary Examiner—W. Donald Bray
Attorney, Agent, or Firm—Sughrue, Mion, Zinn, Macpeak & Seas

[57] ABSTRACT

An automatic processing head replacement device for a NC type wood working machine in which a rack is provided on one of beams, a carriage is mounted on rails another beam, a slide block is mounted on rails on the other beam, the carriage and slide block are connected together, a pinion on the carriage is driven by a motor and meshes the carriage, the plurality of head holders are arranged in side by side relationship for movement in unison with the carriage and slide block.

4 Claims, 9 Drawing Sheets

AUTOMATIC PROCESSING HEAD REPLACEMENT DEVICE IN WOOD WORKING MACHINE

BACKGROUND OF THE INVENTION

This invention relates to a wood working machine and more particularly, an automatic processing head replacement device for a complex processing NC (Numerical Control) type wood working machine which comprises a plurality of processing heads for performing different processing operations such as router-, drill-, grinding- and planing-heads each including a motor for operating each head independently of the other heads and in which any one of the heads selected for performing a selected processing operation is operated.

One example of the prior art automatic processing head replacement devices has been provided by the applicant of this application and shown in Japanese patent application publication No. 33281/1984. In the prior art processing head replacement device, a central column is provided with vertical rails on the front face thereof and a ram is mounted on the rails for slidable movement along the rails. The ram is moved upwardly and downwardly by a screw shaft which is rotated by a motor. Left- and right-hand horizontal beams are mounted on the left- and right-hand sides of the central column. The beams divert leftwards and rightwards, respectively, short of the ram to provide a predetermined clearance between the ram and the beams. Two horizontal rails are provided on each of the beams and the front face of the ram is also provided with upper and lower short rails which are adapted to connect between the rails on the left-and right-hand beams when the ram rails reach the same level as the beam rails.

A plurality of head holders (five head holders, for example) are vertically mounted in side by side relationship in a single row on the upper and lower rails, respectively, for leftward and rightward slidable movement along the respectively associated rails. When the rails on the left-and right-hand beams are connected to each other by the rails on the ram, the head holders can reciprocally move between the left- and right-hand beams and only one head holder is supported on the ram when the one head holder is positioned in the clearance defined between the ram and left- and right-hand beams and move upwardly in unison with the ram. A head base in mounted on the front face of each head holder to be adjusted in vertical position and as mentioned hereinabove, when the processing heads are attached to the head bases, the heads can be individually adjusted in vertical position. The ram can detachably hold only one processing head through one head holder at one time. The ram is provided with a connector which can provide power to only the one processing head held thereon. Only the one head held on the ram is moved in unison therewith and performs its assigned processing operation as the motor is driven. Horizontally supported on the left- and right-hand beams are left- and right-hand hydraulic cylinders which simultaneously slide leftwards and rightwards having five base holders pinched between the piston rods. Furthermore, in order to hold one processing head to be employed and now positioned in the clearance between the left- and right-hand beams, stopper electromagnets are provided on the left- and right-hand beams for regulating the slidable movement of the head holders by plungers and a plurality of such stopper electromagnets are fixedly secured to each beam in a predetermined spaced relationship. The ram also has similar stopper electromagnets fixedly secured thereto.

However, the prior art processing head replacement device having the components arranged and constructed as mentioned hereinabove has the following disadvantages:

(1) In optionally selecting one processing head out of a plurality of processing heads, two hydraulic cylinders and a plurality of stopper electromagnets are required and thus, the prior art processing head replacement device has a great number of parts and a complicate construction.

(2) In order to simultaneously sliding a plurality of head holders, the head holders are pinched between the piston rods of the left- and right-hand hydraulic cylinders, the hydraulic cylinders are alternately operated and the processing head positioning is effected by electrically turning the electromagnets on and off to regulate the slidable movement of the slide by the plungers of the cylinders. Thus, it is difficult to control oil pressure and precisely position the processing heads.

(3) Since a plurality of head holders are caused to abut against each other and moved with the holders pinched between the piston rods of the left- and right-hand hydraulic cylinders, when a processing head having the width larger than that of the head holders, spacers have to be interposed between the head holders so that the adjacent processing heads will not interfere with each other. And in connection with the interposing of the spacers, the position of the stopper electromagnets have to be varied accordingly.

(4) When the number of the head holders is varied, the design of the oil pressure control for the hydraulic cylinders have to changed accordingly.

SUMMARY OF THE INVENTION

Thus, the present invention has its object to provide a novel and improved automatic processing head replacement device which can eliminate the drawbacks inherent to the prior art device referred to hereinabove.

The automatic processing head replacement device according to the present invention is applicable to a wood working machine which has the same fundamental construction as that of the conventional wood working machine in which the ram is mounted on the vertical rails provided on the front face of the center column for slidable movement along the rails, the left- and right-hand horizontal beams are provided on the left- and right-hand sides of the column so as to divert leftwards and rightwards, respectively, short of the ram to define a clearance between the column and the left- and right-hand horizontal beams, the beams are provided with rails for guiding a plurality of head holders arranged in side by side relationship in a single row for leftward and rightward slidable movement, the front face of the column is also provided with short rails, only the head holder positioned in the clearance defined by the beams on the left- and right-hand beams and the column is supported by the column and the processing head held on the one head holder can move vertically in unison with the ram. The automatic processing head replacement device of the invention is featured by the followings.

That is, according to the present invention, one of the left- and right-hand beams is further provided with a rack parallel to the rails on the one beam. The rails on the one beam support a carriage for leftward and rightward slidable movement and the rails on the other beam support a slide block for slidable movement. The carriage and slide block are connected together through a stay. Mounted on the carriage are a motor for driving the carriage and a pinion to be rotated by the motor. The pinion meshes with the above-mentioned rack and the carriage slides along the rails when the pinion rotates as the motor is driven. The above-mentioned head holders are disposed in side by side relationship between the carriage and slide move leftwards or rightwards in unison. The ram is provided with a sensor for positioning the head holders and when any optional one head holder is detected by the sensor, the motor for the carriage is turned off resulting in the stoppage of the carriage.

With the above-mentioned construction and arrangement of the components of the automatic head holder replacement device according to the present invention, only one processing head replacement motor is required and the positioning and replacement can be performed by only electric control. And a plurality of stopper electromagnets required in the prior art head holder replacement device can be eliminated and the number of the head holders can be easily varied.

The head holders are preferably individually connected to the stay which connects between the carriage and slide block. In such a case, when each head holder is provided with a pin, the stay is provided with a plurality of holes for receiving the pins on the head holders, the stay can easily accommodate head holders different in number and size.

It is also possible that the all head holders are pinched by the carriage and slide block so that all the head holders, carriage and slide block are combined into a unitary unit.

The above and other objects and attendant advantages of the present invention will be more readily apparent to those skilled in the art from a reading of the following detailed description in conjunction with the accompanying drawings which show preferred embodiments of the invention for illustration purpose only, but not for limiting the scope of the same thereto.

PREFERRED EMBODIMENTS OF THE INVENTION

Figure 1:
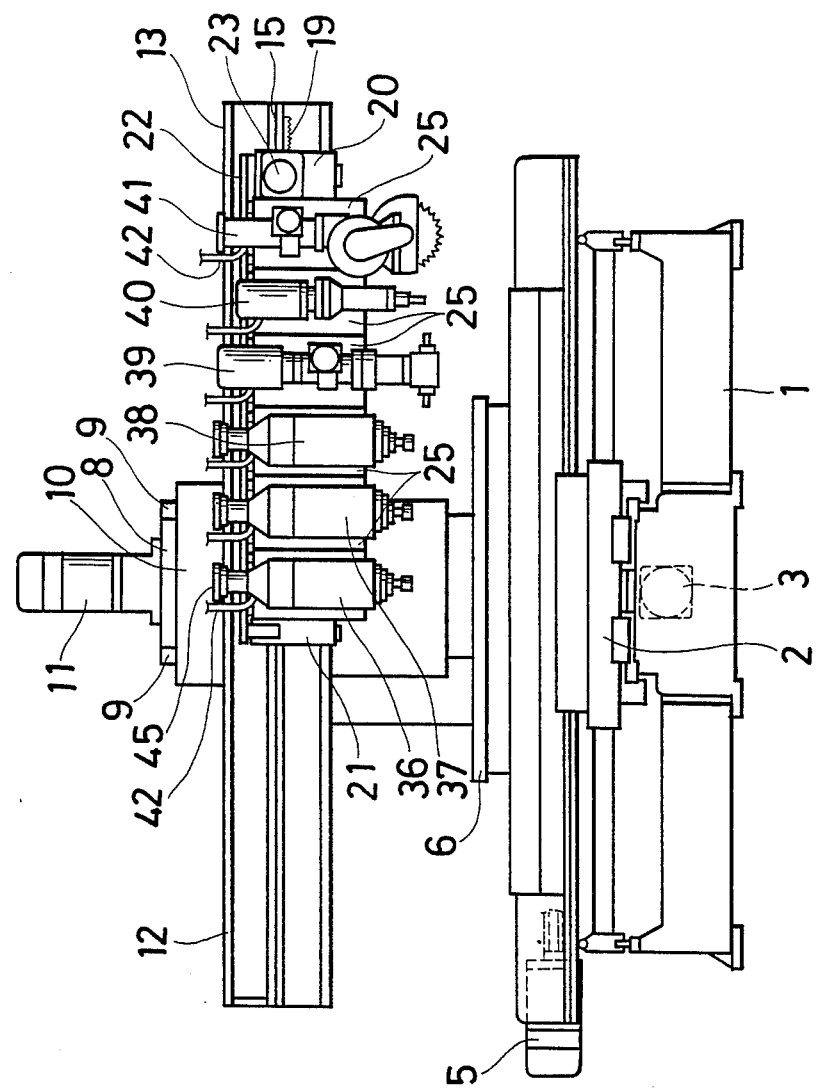
FIG. 1 is a front elevational view of a wood working machine in which a first embodiment of the automatic processing head replacement device constructed in accordance with the present invention is incorporated.
Figure 2:
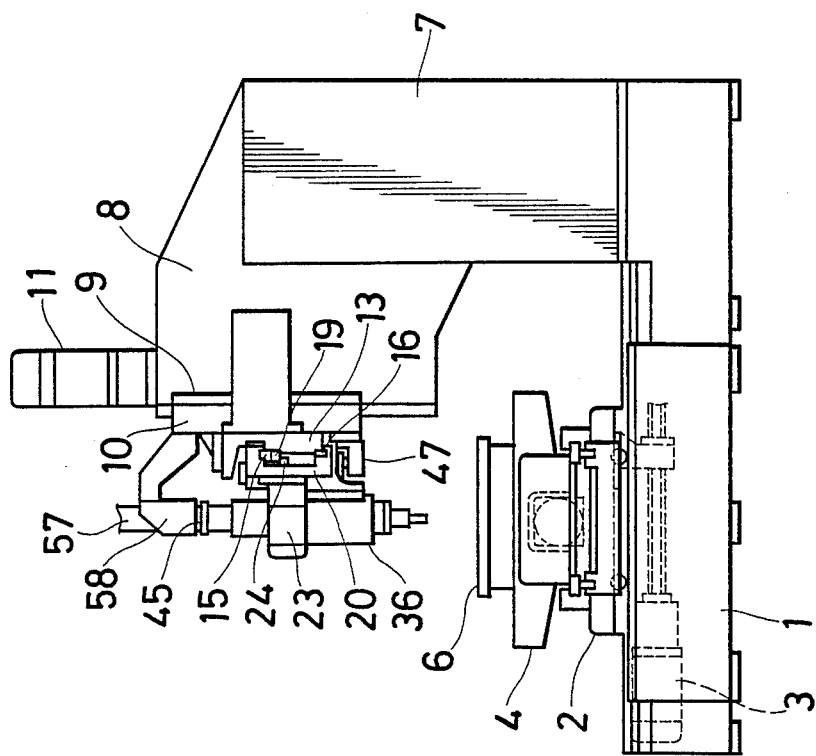
FIG. 2 is a side elevational view of the replacement device.

FIGS. 1 and 2 show a NC type wood working machine in which the first embodiment of the automatic processing head replacement device according to the present invention is incorporated. A table 2 is supported on a bed 1 for horizontal movement on the head back and forth by a motor 3 and another table 4 is supported on the table 2 for horizontal movement transversely of the table 2 by another motor 5. The table 4 is adapted to support thereon a lumber 6 to be processed. The lumber 6 can be moved in different directions and different horizontal planes.

An upright column 7 is provided at the central area of the rear portion of the bed 1 and has a forwardly projecting hollow head 8. Two vertical rails 9, 9 are provided on the front face of the head 8 and a ram 10 is mounted on the rails for vertically slidable movement along the rails. The ram 10 is shown in a vertically sectional view in FIG. 3. Mounted within the head 8 is a mechanism (not shown) which automatically and vertically moves the ram 10 by means of a ram drive motor 11 attached to the head 8. Left- and right-hand beams 12, 13 are mounted on the left- and right-hand sides of the head 8 and extend horizontally with respect to the head. As more clearly shown in FIGS. 3 to 6 inclusive. The beams 12, 13 divert from each other leftwards and rightwards, respectively, in positions short of the ram 10 to thereby provide a clearance 14 between the ram and beams to allow parts secured to the central area of the front face of the ram 10 to pass vertically there as will be described hereinafter.

The left- and right-hand beams 12, 13 are provided on the front faces thereof with upper and lower parallel horizontal rails 15, 16, 15, 16 extending along the beams 12, 13. And more clearly shown in FIGS. 3 and 6, the central area of the front face of the ram 11 is also provided with short horizontal rails 17, 18 in parallelism. When the rails 17, 18 lie in the same level as the upper and lower rails 15, 16 on the left- and right-hand rails 12, 13, the rails 17, 18 connect between the upper and lower rails 15, 16 on the left- and right-hand rails, respectively. The front face of the right-hand beam 13 is also provided with a rack 19 along the lower edge of the upper rail 15.

A vertical carriage 20 is mounted on the upper end lower rails 15, 16 on the right-hand beam 13 and a vertical slide block 21 is mounted on the upper and lower rails 15, 16 on the left-hand beam 12 for leftward and rightward slidable movement as will be described hereinafter. A long stay 22 is connected to the upper edges of the carriage 20 and slide block 21 so that the carriage and slide block 21 can slide horizontally at the same time. A reversible motor 23 is mounted on the front face of the carriage 20 to drive the carriage and the rear face of the carriage 20 has a pinion 24 mounted thereon to be rotated by the motor 23. The pinion 24 meshes with the rack 19 and as the motor 23 rotates, the carriage 20 slides leftwards or rightwards along the upper and lower rails 15, 16 on the right-hand beam 13 depending upon the rotational direction of the motor 23.

Figure 3:
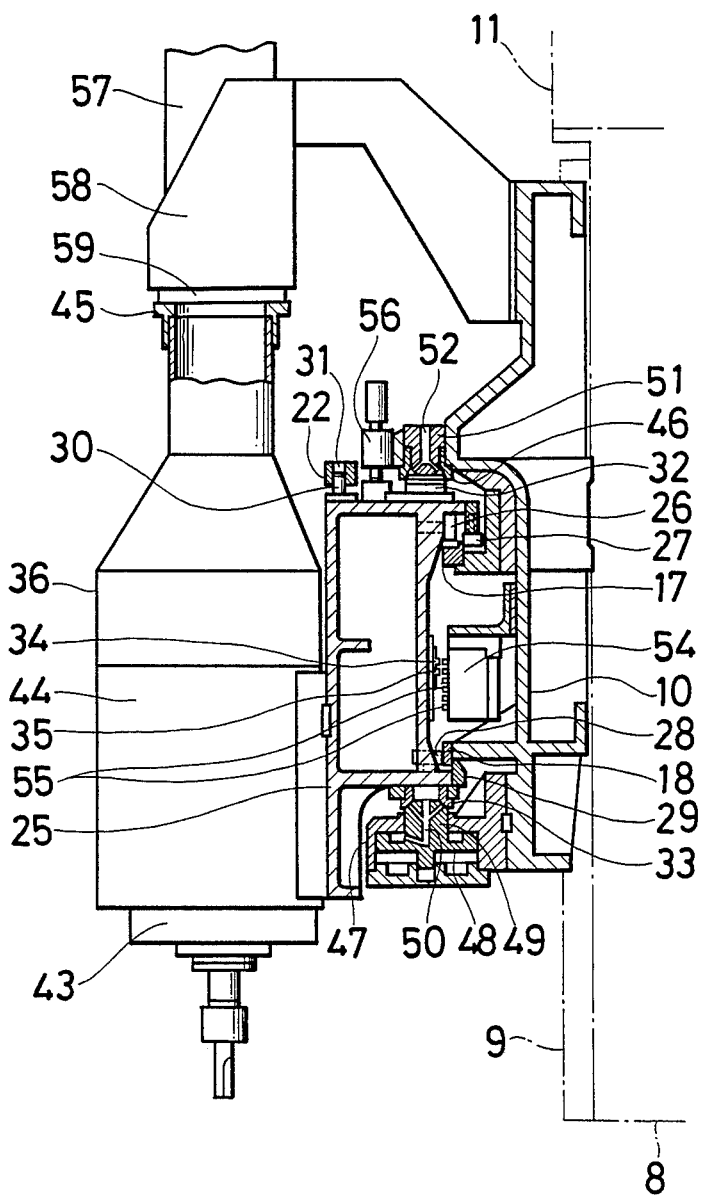
FIG. 3 is a fragmentary side elevational view on an enlarged scale showing the ram and one of the head holders of the device in partial section.
Figure 4:
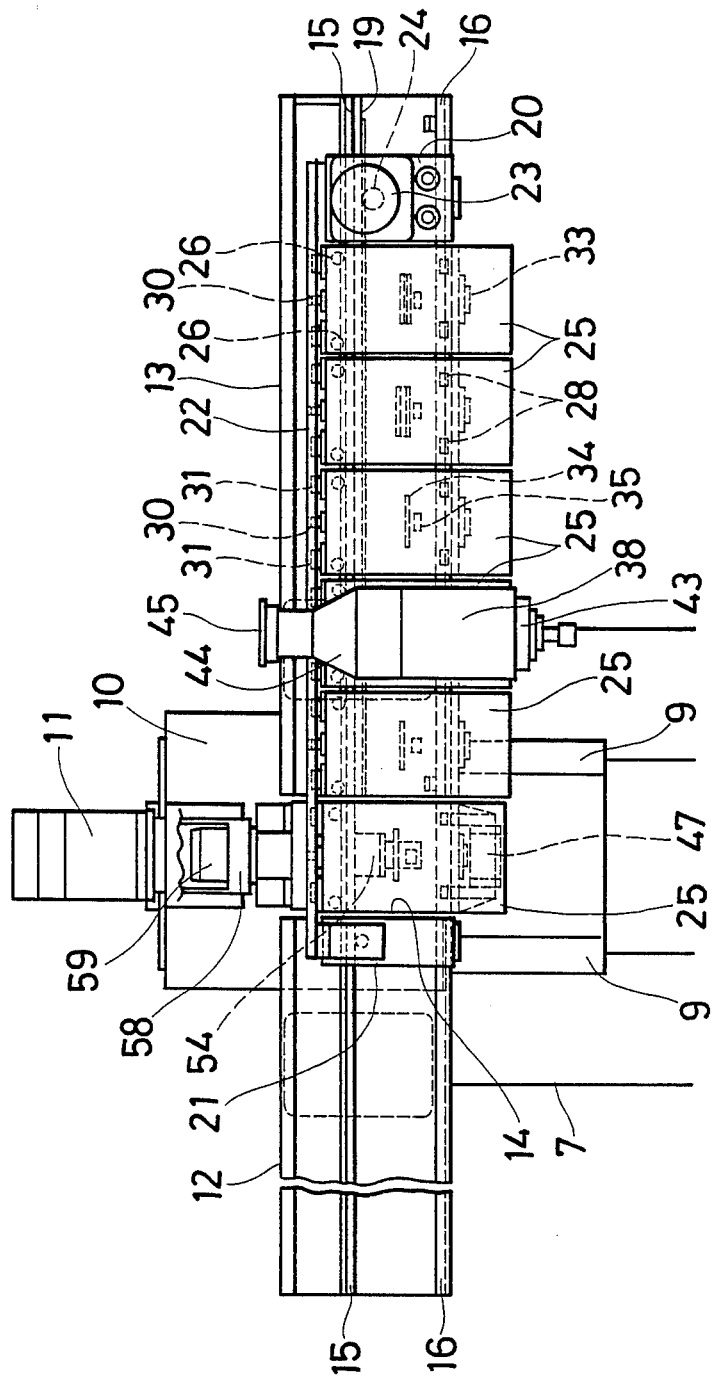
FIG. 4 is a front elevational view showing the relationship between the beam, carriage, head holders and slide block in the device.
Figure 5:
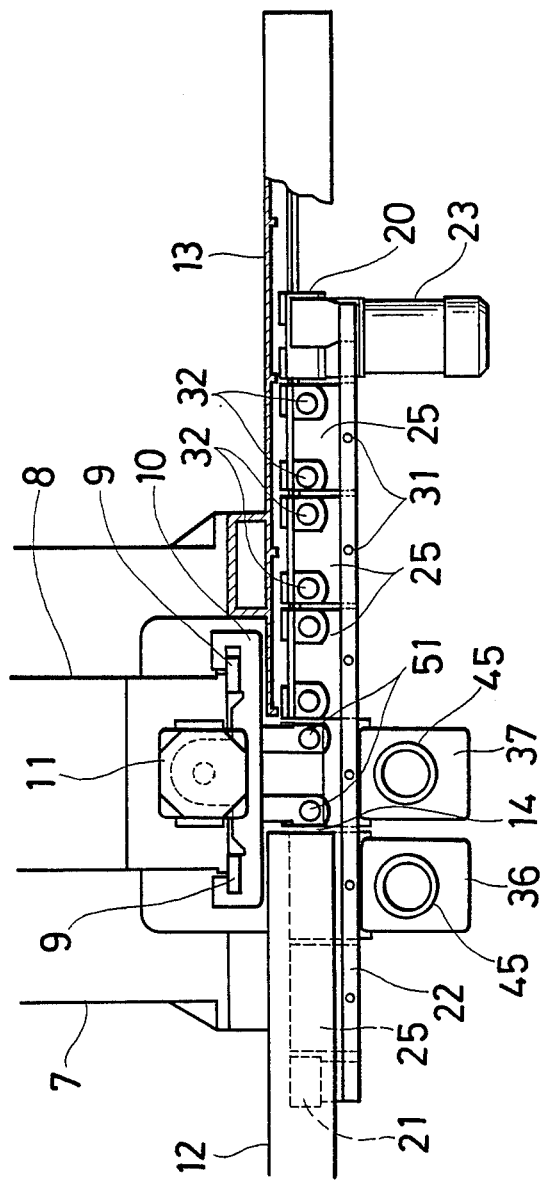
FIG. 5 is a plan view of the relationship shown in FIG. 4 with portion thereof cut away.
Figure 7:
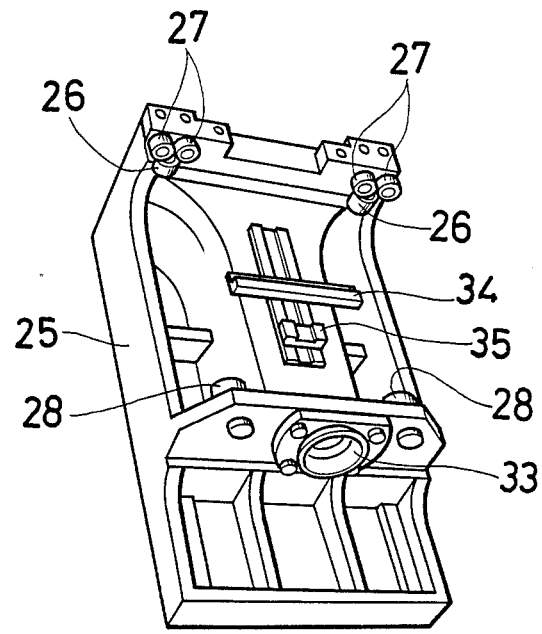
FIG. 7 is a perspective view of one head holder as seen from the back side thereof.

Six (for example) head holders 25 are mounted on the upper and lower rails 15, 16 on the right-hand beam 13 and/or the left-hand beam 12 in side by side relationship in a single row between the carriage 20 and slide block 21 for slidable movement leftwards and rightwards as will be described hereinbelow. As more clearly shown in FIG. 7, rollers 26 and 27 having the horizontal and vertical axis, respectively, are mounted at the opposite side edges of an upper portion of the rear face of each head holder 25 and rollers 28 having the horizontal shafts are mounted at the opposite side edges of a lower portion of the rear face of the head holder. Thus, the upper rollers 26, 27 pinch the upper rail 15 and an abutment plate 29 (FIG. 3) riveted to the head holder 25 and the lower rollers 28 pinch the lower rail 16 whereby each head holder 25 is detachably mounted on the upper and lower rails 15, 16. In FIG. 3, the rollers 26, 27, 28 are shown as confronting the upper and lower rails 17, 18, respectively. As will be supposed from this figure, when the head holders 25 are moved by the carriage 20, the rollers 26 roll along the upper surfaces of the rails 15, the rollers 27 roll along the rear faces of the rails 15 and the rollers 28 roll along the front faces of the lower rails 16. The carriage 20 and slide block 21 are also mounted on the rails 15, 16 in the same manner as the head holders 25.

A pin 30 projects from the central area of the upper surface of each head holder 25 and the stay 22 is formed with holes 31 for receiving the pins 30 on the six head holders. When the pins 30 are received in the corresponding holes 31 in the stay 22, the six head holders 25 are connected to the stay 22 in a row. In addition, the number of the holes 31 may be greater than that of the pins 30 so that the position of the head holders 25 to be connected to the stay 22 may be adjusted.

A pair of left- and right-hand projections 32 protrude from the upper surface of each head holder 25 for positioning the head holder with respect to the ram 10 and a cone 33 is fixedly secured to the central area of the undersurface of the head holder. Furthermore, longer and shorter projection pieces 34, 35 are fixedly secured to the rear face of each head holder 25 to identify the head holder from the other head holders 25. The positions of these projection pieces 34, 35 in the vertical direction of the head holder 25 are different from those of the corresponding parts of the other head holders 25 in order to identify these head holders from each other by binary codes.

A router head, a drill head, a grinding head, a planer head and the like 36–41 for performing different processing operations are replaceably attached to the front face of each head holder. Each processing head comprises a motor for driving its associated tool and each motor is powered through a flexible cable 42. One of the heads or the head 36 shown in FIG. 3, for example, is provided with a motor 43 covered by a hood 44 for rotating a tool such as a router bit to vacuum suck wood chips which will be produced and the hood 44 is provided at the upper end thereof with a mouthpiece 45.

Figure 6:
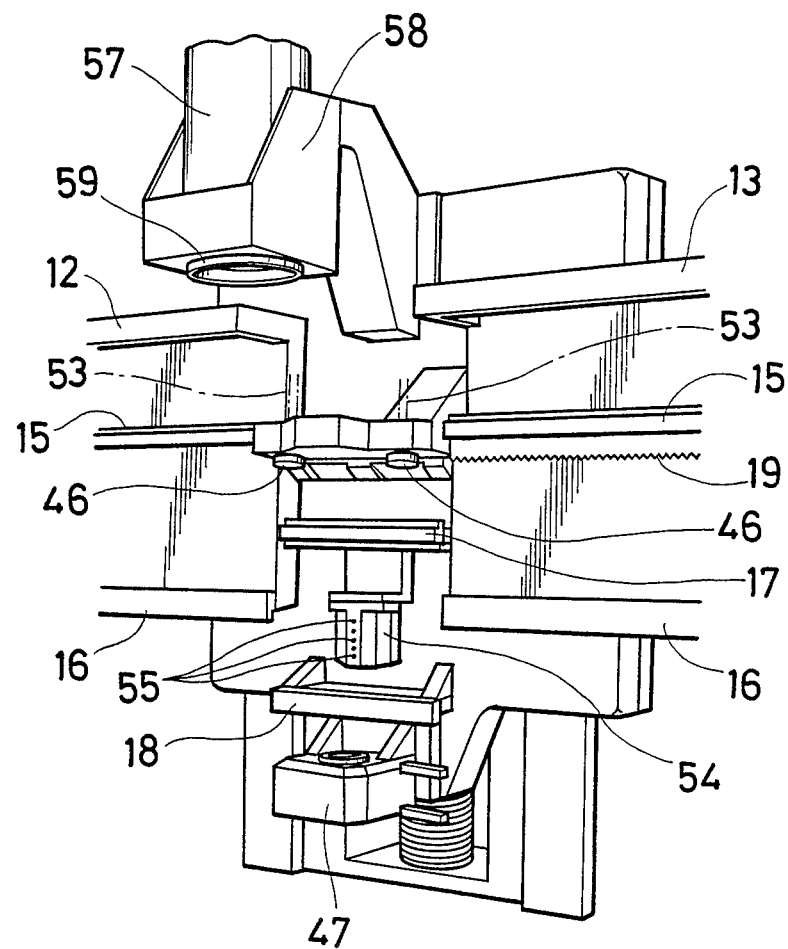
FIG. 6 is a perspective view of the ram and its associated parts.

As more clearly shown in FIG. 6, the front face of the ram 10 facing the clearance 14 is provided with a pair of left- and right-hand positioning cones 46 for receiving the left- and right-hand projections 32 on the associated head holder 25 and with a small pneumatic cylinder 47 in association with the cone 33 on the head holder 25. A piston 48 is disposed within the cylinder 47 for vertically slidable movement. The piston 48 has an integrally formed frusto-conical portion 49 to fit in the cone 33 on the associated head holder 25. The frusto-conical portion 49 is formed with a nozzle 50 spouting a portion of air to be supplied to the pneumatic cylinder 47. The spouting of air through the nozzle 50 is to prevent firm interfitting of the portion 49 and cone 33 by wood chips. Similarly, in order to blow off wood chips from the cone 46 on the ram 10 by air spouting, a core 51 fitted in the cone 46 is formed with a nozzle 52. Air is supplied to nozzle 52 through a hose 53 shown in FIG. 6.

And a sensor unit 54 is attached to the central area of the front face of the ram 10 to electrically identify the six head holders 25 by detecting the projection pieces 34, 35 on the holders 25. Provided on the front face of the sensor unit 54 are a plurality of detector means 55 in a predetermined spaced relationship for detecting the projection pieces 34, 35 with light or magnetism by contacting or without contacting the projection pieces. Furthermore, attached to the front face of the ram 10 is a limit switch 56 which detects whether an optional one head holder 25 is effectively held or not. Still furthermore, a hose holder 58 projects from an upper portion of the front face of the ram 10 for holding the leading end of a flexible saw dust suction hose 57 connected to a vacuum pump (not shown).

The replacement of the processing heads 36–41 with respect to the ram 10 is effected as follows:

First, the ram drive motor 11 is driven to move the ram 10 upwardly and downwardly until the ram reaches a level where the upper and lower rails 17, 18 on the ram connect between the upper and lower rails 15, 15 and 16, 16 on the left- and right-hand beams 12, 13 whereupon the ram is stopped. Next, the motor 23 of the carriage 20 is driven to cause the carriage 20 to slide leftwards or rightwards in unison with sliding movement of the carriage, the six head holders 25 and the processing heads 36–41 simultaneously move so that the six head holders in turn face the ram 10.

When any optional one head holder 25 faces the ram 10 and the projection pieces 34, 35 are detected by the detection means 55 of the sensor unit 54, the carriage 20 is stopped. Thereafter, compressed air is supplied to the pneumatic cylinder 47 to retract the piston 48 to fit in the cone 33 of the head holder 25 which then faces the ram 10 whereby the head holder 25 is lifted slightly. Thus, the pair of projections 32 on the head holder 25 fit in the pair of cones 46 on the ram 10 and the head holder 25 is held by the ram 10 from above and below and on the opposite sides by the cone 46 and piston 48. And when the head holder 25 is lifted, since the upper face of the head holder 25 turns the limit switch 56 on the ram 10 on, it is detected that the head holder 25 is effectively held on the ram 10. And when the processing head having the hood 44 is held on the head holder 25, the mouthpiece 45 of the hood 44 aligns with a mouth ring 59 holding the lower end of the dust suction hose 57. FIG. 3 shows the head holder 25 as being held on the ram 10 in this manner.

Next, the ram drive motor 11 is again driven to lower the ram 10 to the position shown in FIG. 3 and only the head holder 25 held on the ram 10 is lowered together with the processing head held on the head holder. Thus, since only the pin 30 on the one head holder 25 comes out of the corresponding hole 31 in the stay 22, the head holder 25 can move vertically together with the ram 10 independently of the other head holders 25. And the processing head held by the one head holder 25 is moved upwardly and downwardly in unison with the ram 10 in a working position (not shown) below FIG. 3 whereby the lumber 6 is processed.

Figure 10:
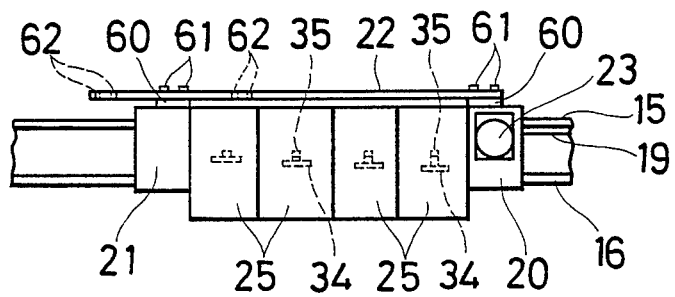
FIG. 10 is a front elevational view showing the relationship between the beam, carriage, head holders and slide block in the second embodiment.

When the processing head is to be replaced by another processing head for performing another type of process on the lumber 6, the ram 10 is first returned upwardly to the position shown in FIG. 10, the supply of compressed air to the pneumatic cylinder 47 is interrupted and the head holder 25 urged upwardly by the piston 48 descends down with respect to the ram 10 to be held on the upper and lower rails 17, 18. Thereafter, the carriage 20 is moved until another head holder 25 is held on the ram 10 as described in connection with the first-mentioned head holder 25 which is to be replaced.

Figure 8:
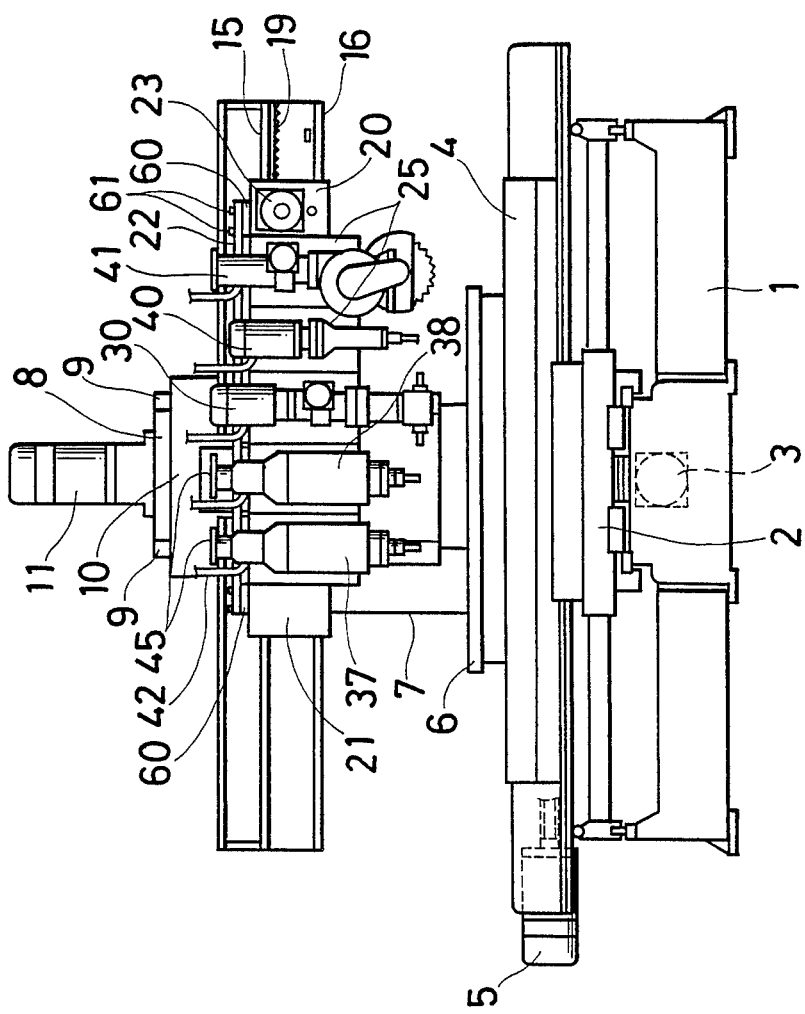
FIG. 8 is a front elevational view of a wood working machine in which a second embodiment of the automatic processing head replacement device constructed in accordance with the present invention is incorporated.
Figure 9:
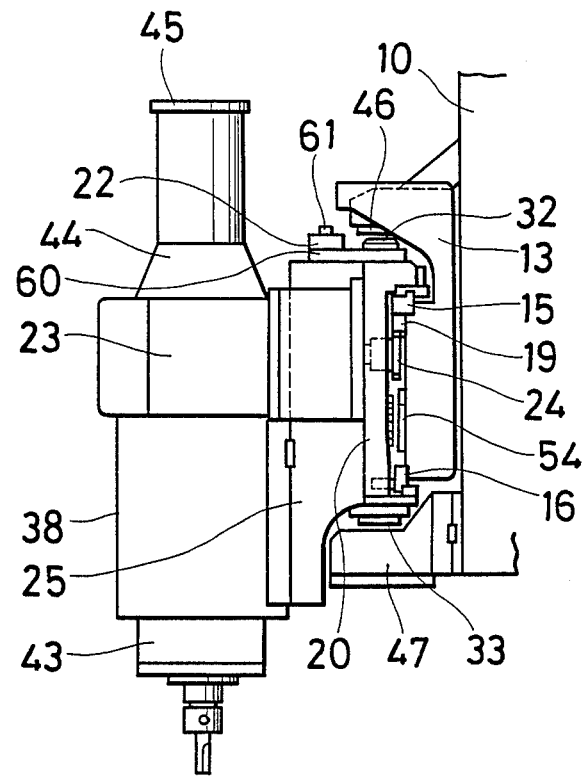
FIG. 9 is a side elevational view on an enlarged scale of a portion of the second embodiment.

FIGS. 8 to 10 inclusive show another embodiment of the automatic processing head replacement device according to the present invention. In this embodiment, the stay 22 is fixedly secured to the carriage 20 and slide block 21 through a spacer 60 by means of bolts 61 to directly pinch a plurality of head holders 25 (five head holders in this embodiment) in cooperation with the carriage 20 and slide block 21. And in this embodiment, a plurality of holes 62 are provided in the stay 22 in spaced relationship in the longitudinal direction of the stay 22 for screwing the bolts 61 in the slide block 21 so that variation in the number of the head holders 25 is accommodated by changing the securing positions of the slide block 21 with respect to the stay 22.

It should be understood that the scope of the present invention is not limited to the embodiments referred to hereinabove, various changes and modifications may be made on the embodiments without departing from the technical principle of the invention.

What is claimed is:

1. A wood working machine, comprising:
   a column having vertical rails provided on a front face thereof;
   a ram slidably mounted on said vertical rails and extending vertically;
   left- and right-hand horizontal beams respectively mounted on opposite sides of said column, said beams being spaced from each other proximate said ram to define a predetermined clearance therebetween to allow for vertical movement of said ram;
   first-guide means disposed on said beams for guiding a plurality of head holders arranged in side by side relationship for leftward and rightward slidable movement;
   second guide means disposed on the front face of said ram, said second guide means being alignable with said first guide means such that said second guide means can receive one of said head holders from said first guide means;
   a rack provided on one of said left- and right-hand beams in parallel to said first and second guide means;
   a carriage mounted on said first guide means on one of said beams for leftward and rightward slidable movement;
   a slide block mounted on said first guide means of another of said beams, said carriage and said slide block being connected together by means of a stay for slidable movement in unison;
   a motor mounted on said carriage for driving the carriage;
   a pinion mounted on said carriage to be driven by said motor and meshing with said rack for moving said carriage along said first guide means on said one beam, said plurality of head holders being arranged in side by side relationship between said carriage and said slide block for movement in unison therewith; and
   a sensor mounted on said ram for detecting any optional one of said head holders to stop said motor on the carriage.

2. The automatic processing head replacement device as set forth in claim 1 wherein said head holders are individually connected to said stay.

3. The automatic processing head replacement device as set forth in claim 2 wherein each head holder has a pin and said stay is formed with a plurality of holes for receiving the pins on the head holders.

4. The automatic processing head replacement device as set forth in claim 1 wherein all the head holders are pinched by said carriage and slide block.

* * * * *